April 15, 1958     O. E. GIBSON     2,830,352
TILE MOLDING TABLE

Filed April 23, 1953     3 Sheets-Sheet 1

INVENTOR.
Oliver E. Gibson
BY
Att'y

April 15, 1958  O. E. GIBSON  2,830,352
TILE MOLDING TABLE
Filed April 23, 1953  3 Sheets-Sheet 2

INVENTOR.
Oliver E. Gibson
BY
Atty

April 15, 1958  O. E. GIBSON  2,830,352
TILE MOLDING TABLE
Filed April 23, 1953  3 Sheets-Sheet 3
Fig. 5
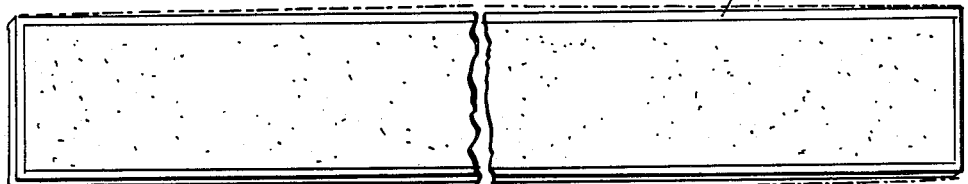
Fig. 6
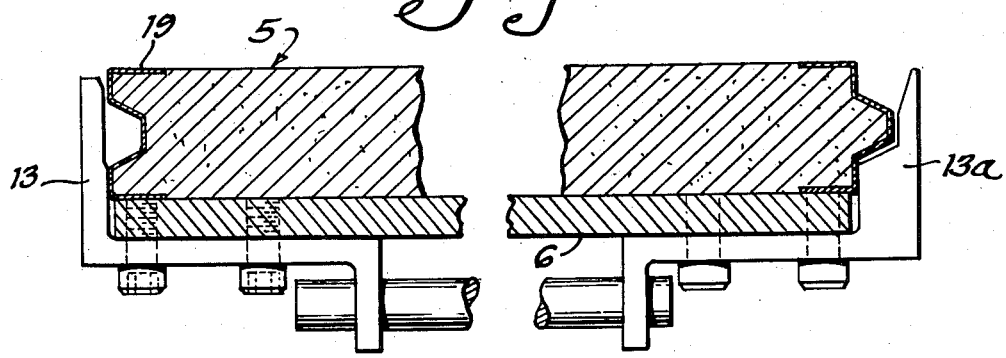
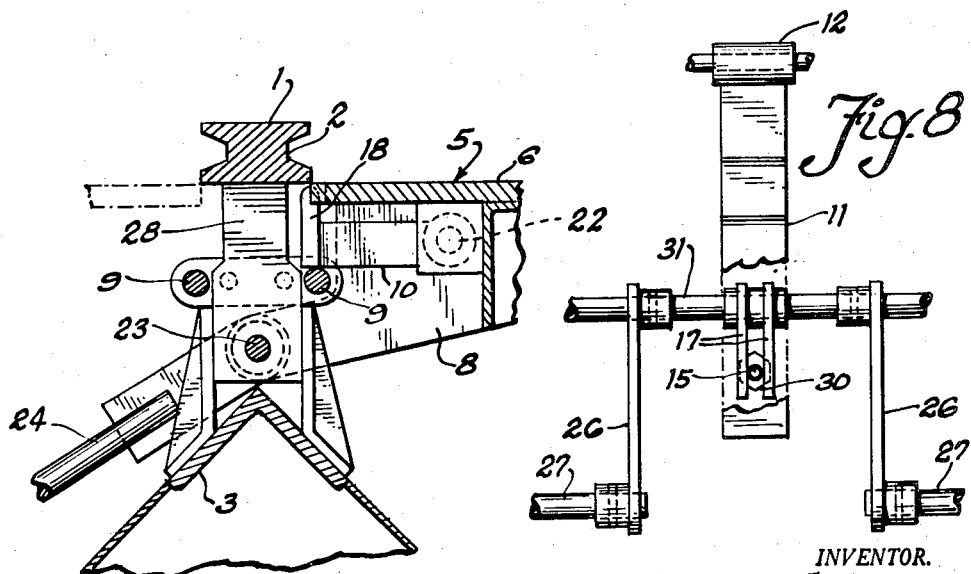
Fig. 7
Fig. 8
INVENTOR.
Oliver E. Gibson
BY
Richard Ericson
Att'y

United States Patent Office 2,830,352
Patented Apr. 15, 1958

2,830,352

TILE MOLDING TABLE

Oliver E. Gibson, Chicago, Ill., assignor to United States Gypsum Company, Chicago, Ill., a corporation of Illinois Application April 23, 1953, Serial No. 350,619

2 Claims. (Cl. 25—42)

This invention relates to a tile molding table particularly one which can be manually controlled and manually or mechanically operated and which is adapted to the casting of a cementitious slurry into a tile-like building product with preformed reinforced edges.

The building industry has used for some time tiles and planks made from cementitious slabs with a preformed metal edge reinforcement. The edges usually interlock. A tongue and groove type joint is preferred. In the case of roofs, these slabs or planks are placed over purlins and secured thereto by means of clips. While practically any cementitious material can be used to form the slab, the industry has preferred set calcined gypsum as it is comparatively light in weight, is an excellent fire-proofing material, has sufficient strength for most purposes and is of low cost. It also can be made to harden quickly thereby permitting a greater number of tile to be made with a single mold in a day.

In preparing these planks or tile, particularly those made from set calcined gypsum, a flat table is frequently employed which permits their fabrication manually. This manually operated table is actually a mold so designed as to make each operation as easy and as fast as possible. Various types of molds have been developed for this purpose which while usable still need considerable improvements such as for example: greater ease in opening the mold and removing the tile or plank and in reassembling the mold for re-use. Also a more efficient way of inserting, positioning and securing the preformed edge reinforcing is needed.

It is therefore, an object of this invention to set forth an improved mold for forming cementitious planks, particularly those made from gypsum, with preformed reinforced edges.

Another object of this invention is to disclose a manually operated or controlled table type mold which is easy to open and reassemble.

A further object of this invention is to present a novel means of loosening the tile from the mold prior to removal.

A still further object of this invention is to set forth an improvement in inserting, positioning and securing the preformed frame constituting the edges of the tile in the mold.

Various other objects will readily occur to those skilled in the art of which this invention is a part after a study of the forthcoming description, accompanying drawings, and appended claims.

This invention is best understood by means of the following drawings in which like elements are given the same reference number.

Figure 5 illustrates the positions of the metal frame before and after aligning in the mold.

Figure 6 is a cross-sectional view taken along the line 6—6 of Figure 1 showing the end positioning lugs.

Figure 7 is a section depicting the pivoted mounting of the table, the counterweights and the tile seal breaking means.

Figure 8 shows the arrangement of levers and shafts which enables the locking pin to be foot-released by the operator at various positions.

Figure 1:
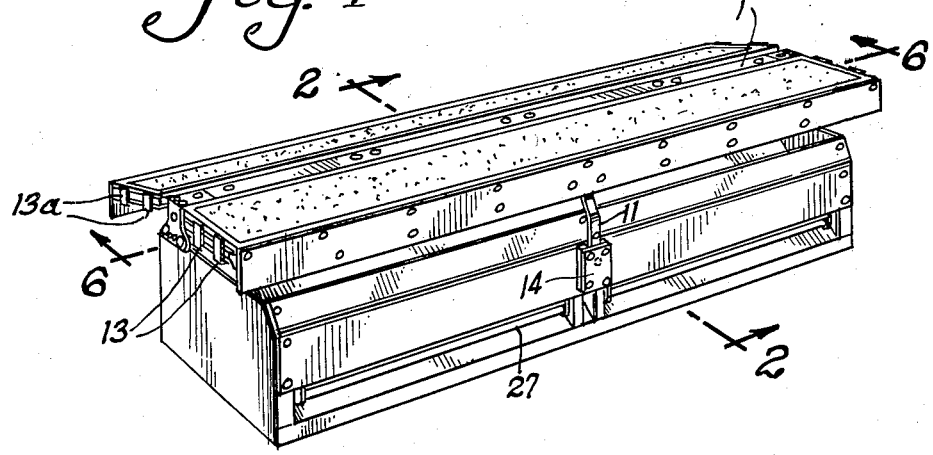
Figure 1 is a perspective view of the tile mold forming the subject of this invention after the cementitious material has hardened with a tile on one side in a tilted position ready for removal.
Figure 2:
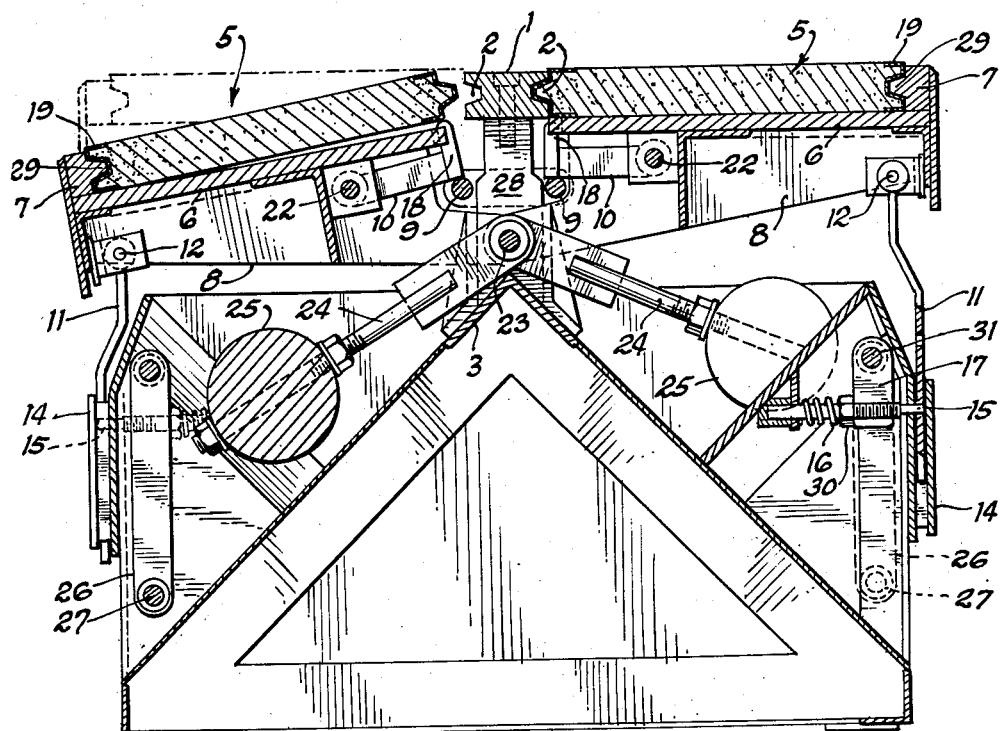
Figure 2 is a cross-sectional view taken along the line 2—2 of Figure 1.
Figure 3:
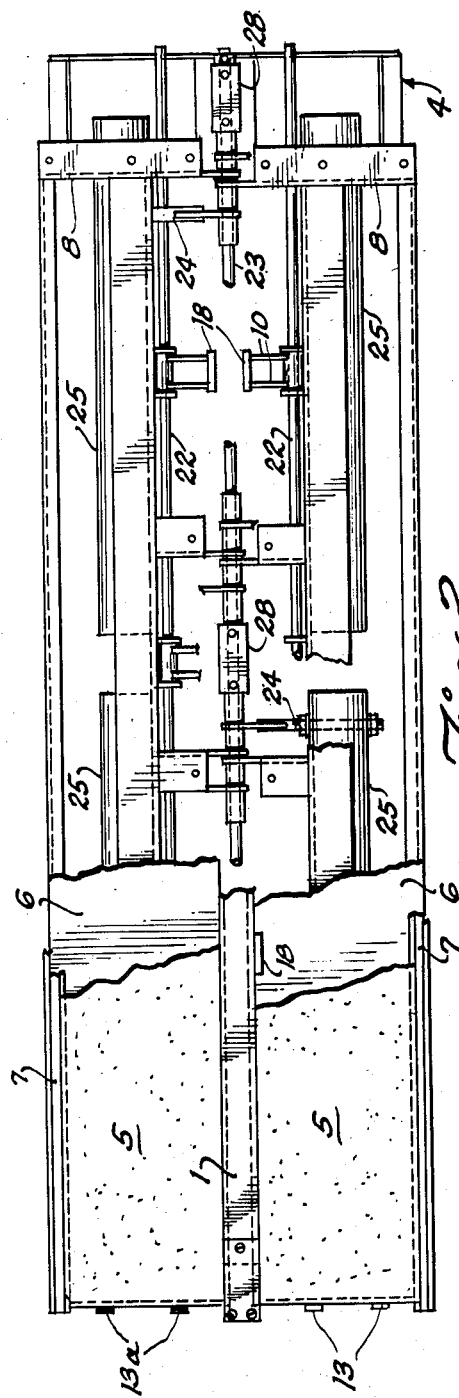
Figure 3 is a top view of the mold partially broken away.
Figure 4:
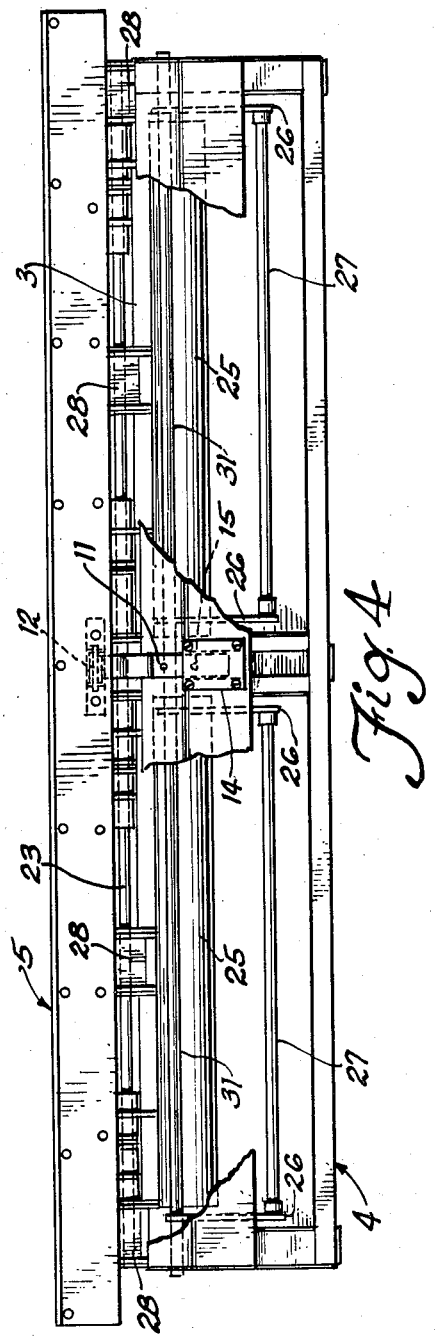
Figure 4 is a side view of the mold.

In preparing a molding table following this invention, it is desirable to use two parallel disposed cavities or molds so that two tiles or planks can be molded at one time. A member 1 is spaced between the two molds in a fixed position and forms a part thereof. See Figure 2. This member has the grooves 2 along its longitudinal edges for receiving the tongues of the metal frames. The member 1 is attached to angle 3 by the brackets 28, the angle 3 is part of the frame and is supported in any suitable manner such as by the triangular shaped legs 4. The remaining portion of each mold constitutes the tilting flat bed members 5. These members have a flat portion 6 forming the bottom portion of the mold and along the outside longitudinal edges thereof are attached the members 7 for fixing the edge reinforcing in place. These members can either be continuous strips as shown or discontinuous. In any case, a tongue 29 is provided along the inside edge to receive the groove portion of the edge reinforcing frame. This frame extends completely around the edges of the tile to be molded. Lugs 13 and 13A are positioned along each end to hold the ends of the frame in alignment, see Figure 6. The metal frame itself is actually the mold. The tilting members 5 are pivoted by being attached to the brackets 8 rotating on shafts 23 supported by the brackets 28. The brackets 8 extend across the shaft to which are secured the arms 24 supporting the counterweights 25. The outer edges of the tilting members 5 are secured at their centers to the sliding support arms 11 by means of the pivoted elements 12. These slides are capable of moving up and down through the guides 14. Extending through the inner portion of each guide is a pin 15 which engages holes in the sliding support arms 11 when the tilting member is in any predetermined position such as for casting and loading. A spring 16 extends around each pin and urges it into the hole at all times thus assuring a fixed position of the members 5 until the pin is released by the operator. The pin is released by the yoke 17 bearing against the head 30 of the pin so that an inward motion of the yoke will withdraw the pin from the hole and compress the spring. When the pin is removed from the hole in the sliding support arm 11, the tilting member drops or raises depending on the balance of weight. The yoke 17 is keyed to the shaft 31. The lever arms 26 are also keyed to the shaft 31 and to foot bars 27, see Figure 8, thus when the foot bars 27 are forced inward the yoke 17 also moves in the same direction and releases the pin in the manner referred to above, thereby permitting the tilting member 5 to move.

During the downward motion of the tilting member, the seal between the cast tile and the flat portion 6 is broken thus facilitating the removal of the tile from the mold. This breaking of the seal takes place when the fingers 18, which are nested into the portion 6 when in the normal casting positions, move above the surface thereof and against the metal frame 19 of the cast tile when the member 5 is tilted. This is accomplished by attaching the fingers 18 to the fulcrum arms 10 pivoted on the shafts 22. The lower portion of the pin rests on the shafts 9. By this arrangement, the pin is actually eccentrically mounted. Due to this eccentricity, the rotating motion of the pins and their arms around the shafts 9, when the member 5 is tilted, forces the pins outward from the surface of the mold against the metal frame of the tile, thereby loosening it from the bed 6.

It is within the scope of this invention to have the counterweights 25 so adjusted that they counterpoise the tilting members 5 in such a manner that they drop into tilted position upon release of the pins when the freshly molded tiles are in place, but bring the members back to the molding position when the tiles are removed and the pin is released. This does away with the necessity for the operator to reach down and raise the members to the casting position again.

It is preferred to insert the sheetmetal frame forming the edges of the tile into the mold while open in a tilted position as it is an important part of this invention to have a predetermined outer camber along the longitudinal edges of the metal frame, such as illustrated in Figure 5 in broken lines, before it is inserted into the mold. The frame in this camber or bowed condition could not be conveniently inserted while the mold is in the casting position. When the mold is then raised back into the casting position, the bowed longitudinal edges are clamped in place and distorted into a substantially straight line, thus removing the camber and causing the edges to bear outwards against the mold. The camber does not return when the tile is removed. Frames commonly used in the past do not have this outer camber and are substantially straight; this results in an inward bowing when the frames are in the casting position and is highly objectionable. To overcome this, it has always been necessary to place wooden spacer strips inside the mold to force the longitudinal edges apart and against the mold to form a straight line. This is an added step in the operation. These wooden spacer strips must be left within the tile after casting, causing a decrease in strength.

Any woven wire mesh required to reinforce the cementitious slab within the area defined by the metal edge is added before the cementitious slurry is poured. Both molds are poured at the same time with the preformed edge reinforcing acting as screed guides to form a smooth surface on the top of the tile. Any surplus material spills over the sides of the molds and can be readily scraped off.

The cast tile is permitted to harden sufficiently so that it will not be injured when removed. The tiles are cured, if formed of Portland cement or dried if of set calcined gypsum. They are then ready for use in constructing floors, roofs or walls.

Various modifications can be made in the above description of this invention. For example, any hardenable, fluid material can be used to form the body of the tile, but a cementitious type is preferred. While in the above example the edge reinforcement is referred to as being made of sheetmetal, other materials can be used, such as paper, plastics, vulcanized fiber or even cast metal. It is possible to dispense with the counterweights and to use mechanical means such as pneumatic or hydraulic cylinders to move the molds. In which case the valves can, if desired, be operated by the foot. The locking and releasing mechanism may, in this case, not be required. However, it is much preferred to carry out this invention in the manner set forth in detail above.

A wide range of shapes and sizes of tile or planks can be made on the mold forming the subject of this invention by a simple variation in its construction and still be within the ambit of this invention. Hence, the word "tile" is to be construed as any material which has reinforced edges enclosing a hardened plastic or fluid material.

Also, it is within the intention of this invention to reverse the arrangement of the edges of the frame constituting the reinforcement, in the mold so that the portion 2 of element 1 can engage the groove side of the frame instead of the tongue as shown. The other portions of the mold can be similarly changed. Various other shapes of edges can be used by merely altering the shape of the edge reinforcement constituting the frame.

While a particular embodiment of this invention has been illustrated and described, it is understood that the scope of this invention is not to be limited thereto, but to all the modifications which are contemplated by a broad interpretation of the above description and of the appended claims.

I claim:

1. A tile molding table for casting an edge-reinforced cementitious tile formed from a metal frame enclosing the edges of a cementitious cast encased therein, said frame having interlocking opposite edges and serving as an edge mold for enclosing said cementitious material while in a pourable condition, comprising a flat mold bed mounted upon a support and frame engaging and positioning means extending around the periphery of said mold bed to contain all the edges of said metal frame in fixed and squared relation as it rests upon said mold bed while in a horizontal, closed, pouring position, said frame-engaging means interlocking with the opposite longitudinal edges of said frame when in said closed, pouring position and means for pivotally attaching said mold bed to said support for movement of said mold bed in an arc from a horizontal, closed, pouring position to an inclined, open, loading and unloading position; one of said frame engaging means, interlocking with one of said longitudinal edges of said frame, in stationary attachment to said support and in non-engaging relation with said longitudinal edge of said frame when said mold bed and said frame are in said inclined, open, loading and unloading position and a tile separating means positioned within said mold bed under said longitudinal edge of said frame for progressively raising said edge as said mold bed is moved to said inclined, open, loading and unloading position, thereby gradually and uniformly breaking the adhesion between the tile and said bed from said longitudinal edge to the other.

2. The tile molding table claimed in claim 1 in which said tile separating means comprises a fulcrum arm attached, pivoted to and underneath said mold bed; the opposite end of said arm pivotedly resting upon a stationary portion of said molding table and a finger portion of said arm in an engageable position under said longitudinal edge whereby said finger portion progressively raises said longitudinal edge as said mold bed is moved from said pouring position to said inclined, open, loading and unloading position, thereby, gradually and uniformly breaking the adhesive between the tile and said bed from said longitudinal edge to the other.

References Cited in the file of this patent

UNITED STATES PATENTS

| | | |
|---|---|---|
| 1,018,072 | Neeley | Feb. 20, 1912 |
| 1,019,250 | Herzberg | Mar. 5, 1912 |
| 1,148,246 | Marvin | July 27, 1915 |
| 1,563,798 | Sargeant | Dec. 1, 1925 |
| 1,998,117 | Brush | Apr. 16, 1935 |
| 2,489,607 | Alexander | Nov. 29, 1949 |

FOREIGN PATENTS

| | | |
|---|---|---|
| 177,991 | Great Britain | Apr. 13, 1922 |
| 102,778 | Australia | Jan. 13, 1938 |